Oct. 13, 1964  J. HAGEMANN  3,153,220
DOPPLER LOG AND PLOTTER SYSTEM
Filed Aug. 20, 1954  2 Sheets-Sheet 1

JULIUS HAGEMANN
INVENTOR

BY *George Sipkin*
*Holla N. Carter*
ATTORNEYS

Oct. 13, 1964  J. HAGEMANN  3,153,220
DOPPLER LOG AND PLOTTER SYSTEM
Filed Aug. 20, 1954  2 Sheets-Sheet 2
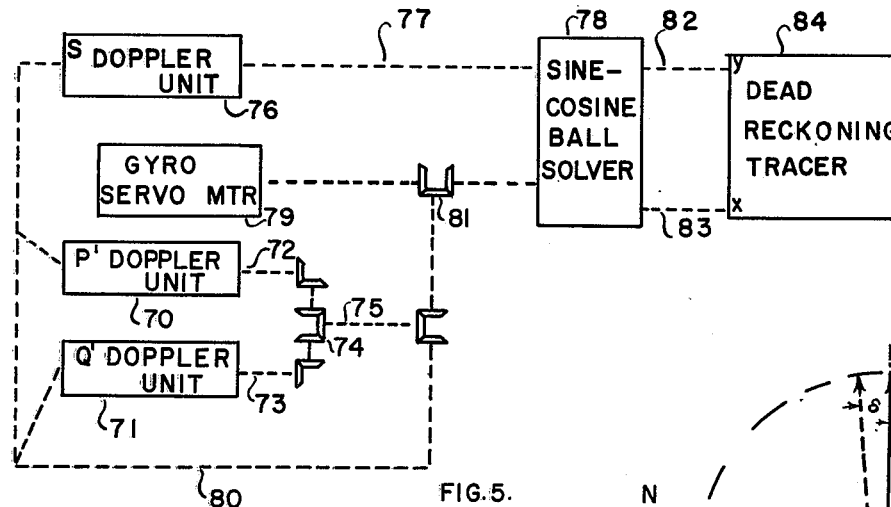
FIG. 5.
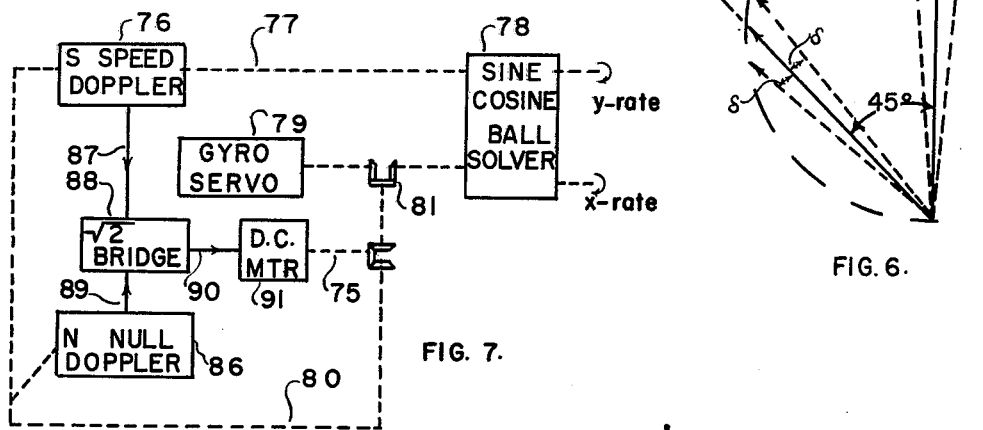
FIG. 7.
FIG. 6.
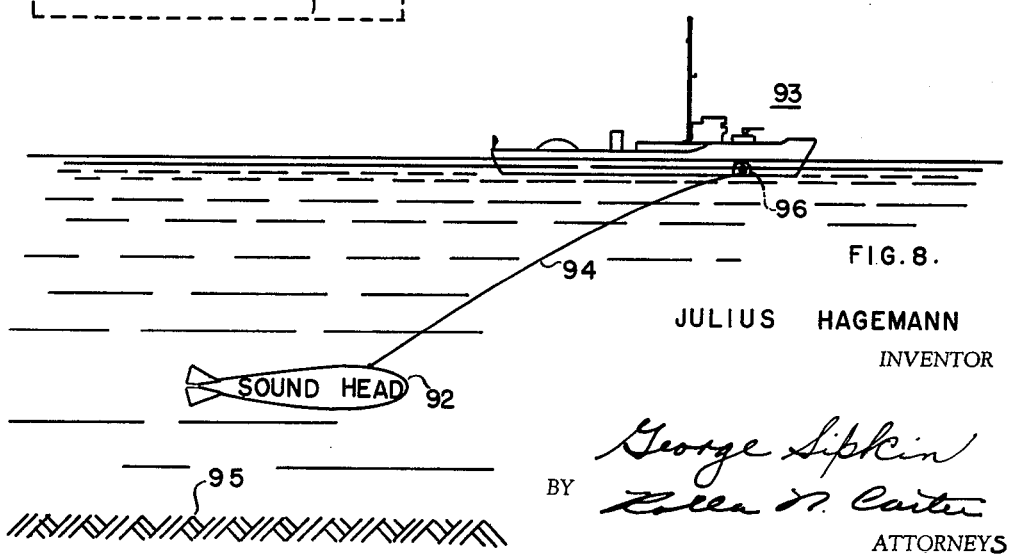
FIG. 8.
JULIUS HAGEMANN
INVENTOR
BY George Sipkin
Rolla N. Carter
ATTORNEYS United States Patent Office 3,153,220
Patented Oct. 13, 1964

3,153,220
DOPPLER LOG AND PLOTTER SYSTEM
Julius Hagemann, 412 S. MacArthur Ave.,
Panama City, Fla.
Filed Aug. 20, 1954, Ser. No. 451,316
2 Claims. (Cl. 340—3)
(Granted under Title 35, U.S. Code (1952), sec. 266)

The present invention relates to the determination of the vessel's true movement with respect to ground and more particularly to a method and apparatus for continuously obtaining physical quantities representative of a vessel's true movement with respect to the sea bottom.

In the art of navigation the piloting of a vessel through definite channels and other restricted waters is at all times hazardous and under many conditions such as exist during periods of low visibility is fraught with real danger. Many techniques and navigational aids have been devised to help the ship's navigator under these conditions, the most widely used possibly being that of dead reckoning. In plotting a ship's course by dead reckoning the navigator plots his ship's location from the last available fix and then from the information he is able to obtain as to the ship's heading, water speed, and the like, and from his own estimation of the possible set and drift due to winds, currents, or tide, he plots what he hopes is the ship's course until such time as another definite fix is obtained. Such dead reckoning techniques are extremely useful, but even a skilled navigator can never feel too certain of the factors he must estimate or calculate, and welcomes with considerable relief the opportunity of taking the next definite fix.

The primary object of the present invention is to provide a method and apparatus which continuously provides information representative of a ship's true speed and movement over the bottom of a seaway.

Another object of the invention is to provide a method for indicating the true movement of a vessel with respect to ground.

A further object of the invention is to provide apparatus which senses the true course of a vessel and provides physical manifestations strictly representative of the true course.

Still another object of the invention is to provide a method and apparatus for automatically and continuously determining the magnitude and direction of a ship's velocity relative to the bottom in terms of physical quantities such as voltages, shaft positions, or shaft turn rates, which are directly utilizable for providing a legible indication of the course made good.

Still another object of the invention is to provide apparatus employing sonar Doppler phenomenon for sensing a ship's movements over the ocean floor and translating the sensed information into language which existing equipment can understand.

Other objects, features and advantages of the invention will suggest themselves to those skilled in the art from the following description when read in connection with the accompanying drawing in which:

FIG. 5 is a schematic showing of an embodiment of the invention operating in accordance with FIG. 4;

FIGS. 6 and 7 illustrate respectively the geometry and apparatus of a simplified form of the invention; and FIG. 8 illustrates a towing arrangement for automatic changes-in-depth compensation.

In accordance with the invention sonor Doppler effects are employed to sense components of a ship's movement over the bottom, which Doppler effects are employed to determine the ship's true speed and movement over the bottom, the arrangement being such that physical quantities accurately representing a ship's course being made good are made continuously available. Also, in accordance with the invention these physical quantities representative of the ship's course are employed to provide a legible indication on a suitable display device of the ship's true movement over the bottom.

Figure 1:
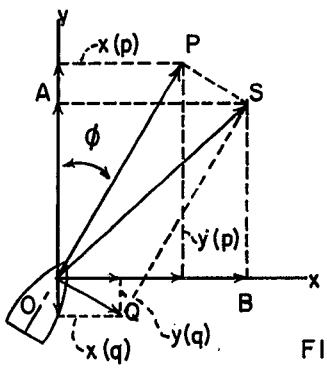
FIG. 1 is a diagram illustrating the geometry underlying the operation of one form of the invention.

Reference is now made to FIG. 1 for explaining the geometry of the problem to be solved by the present invention. A set of axes $x$ and $y$ is shown indicating direction with the $y$ axis parallel to a meridian. The vessel at point O is headed in the direction of the vector OP, the magnitude of which is the ground speed of the vessel in the direction of its heading which, as shown, forms a course angle of $\phi$. The speed of the vessel in the direction of 90° to the heading is represented by the vector OQ. It thus becomes apparent that the resultant vector OS indicates the speed of the vessel in the direction of the course made good (i.e., true speed over ground). This vector OS may be resolved into component vectors OA and OB parallel, respectively, to the $y$ and $x$ axes, thus providing information which may be applied to a geographic plotter, a dead reckoning tracer, or the like.

It can be seen from FIG. 1 and from trigonometric considerations that OA equals OP cos $\phi$ minus OQ sin $\phi$, and OB equals OP sin $\phi$ plus OQ cos $\phi$. Hereinafter, the vectors OP, OQ, and OS will be referred to simply as P, Q, and S, respectively. While the vectors OA and OB are respectively the $y$ and $x$ components of the true speed S which are the components desired for utilization.

In accordance with the invention the north-south and east-west components of the vector representing the magnitude and direction of the ship's velocity relative to the ocean floor are continually determined in terms of certain physical quantities which are employed to register and/or display the ship's true speed and movement over the bottom. More specifically, sonar Doppler in bottom echoes is employed to provide physical manifestations representative of the vectors P and Q (see FIG. 1). Each of these physical manifestations, which may be shaft turn rates, is used as one of the inputs of two sine-cosine converters, the other input to each converter being the changing angular value provided by the ship's gyro. Thus the two outputs of each converter comprise the product of speed and the sine of the course angle and the product of speed and the cosine of the course angle, these four outputs being indicated in FIG. 1 as $x(p)$, $y(p)$, $y(q)$, and $x(q)$. The $y$ components are added algebraically to provide a shaft turn rate representing the north-south component of the ship's velocity relative to the ground and the $x$ components are added algebraically to provide a shaft rate corresponding to the east-west component of the ship's ground speed. Two shaft turn rates are thus available for indicating, displaying or recording the ship's true speed and movement over the ground in any well-known manner such as by a geographic plotter or a dead reckoning tracer.

Figure 2:
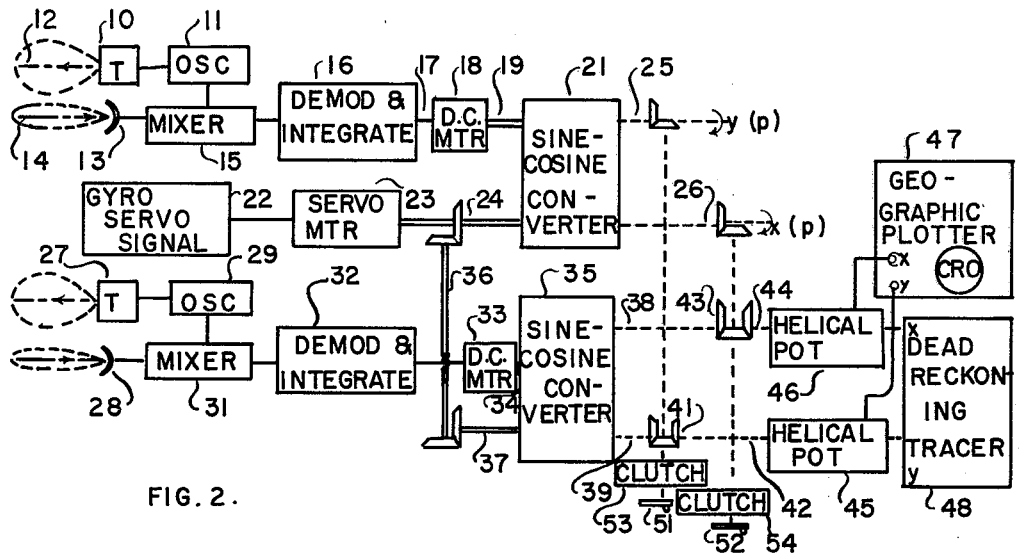
FIG. 2 is a conventionalized diagrammatic showing of an embodiment of the invention which operates in accordance with FIG. 1.

In the embodiment of the invention illustrated in FIG. 2 the system for detecting the speed over ground in the direction of zero relative bearing comprises an electro-acoustic transducer 10 which is driven by an oscillator 11 to transmit sound energy into the water along an axis 12 minus 45° in declination and zero degrees in azimuth with respect to relative bearing. A highly directional receiving transducer 13 has its receiving axis 14 similarly directed so as to receive transmitted signals reflected by the bottom in the vicinity of the transmitting axis 12. The received signal is heterodyned against the oscillator frequency in a mixer 15, the output of which will be a low frequency beat signal proportional to the Doppler shift which in turn is proportional to the ship's speed in the direction of zero relative bearing. This beat frequency is demodulated and integrated in circuits 16 to provide on the output lead 17 a direct current voltage having a magnitude proportional to the speed of the vessel in the direction of its bearing. A motor 18 converts this direct current voltage into a turn rate for a shaft 19 comprising the input shaft for a sine-cosine converter, which may be of the ball solver type. A gyro-servo signal source 22 through a servo-motor 23 transmits course information to the convertor 21 in the form of an angular positioning of a shaft 24. The output shafts 25 and 26 of the convertor 21 thus turn at rates which are proportional to $P \cos \phi$ and $P \sin \phi$, respectively, where P is the ship's speed in the direction of zero relative bearing and $\phi$ is the ship's true course, i.e., the angle between the ship's heading and true north. It is thus apparent that the rates of the shafts 25 and 26 correspond, respectively, to the $y$ and $x$ components of the speed vector P.

A similar system, including a transmitting transducer 27 and a directional receiving transducer 28 directed downwardly 45° in the direction at right angles to the ship's heading, i.e., 90° relative bearing, detects the vessel's speed over ground due to set and drift. Here, again, the signal received by the transducer 28 is heterodyned against the frequency of a driving oscillator 29 in a mixer 31 the output of which is passed through a demodulating and integrating circuit to provide a direct current voltage for driving a motor 33 to produce in a shaft 34 a turn rate which is proportional to the ship's speed over ground at 90° relative bearing, the vector of this speed component being designated Q in FIG. 1. The shaft 34 comprises the input to a sine-cosine converter 35 the angular positioning of which is controlled by the gyro governed servo motor 23 through shafts 36 and 37 suitably geared together and to the shaft 24. The two output shafts 38 and 39 of the converter or solver 35 have turn rates corresponding, respectively, to $Q \cos \phi$ and $Q \sin \phi$, which are respectively the $x$ and $y$ components of the vessel's speed represented by the Q vector. The rotations of the shafts 25 and 39 are combined in a differential 41 to produce rotation of a shaft 42 which is representative of the $y$ component of the true speed S over ground. Similarly, the turn rates of the shafts 26 and 38 are combined in a differential 43 to produce rotation of a shaft 44 at a turn rate representative of the $x$ component of the ground speed S of the vessel. It is thus apparent that the rotating shafts 42 and 44 may be employed to drive helical potentiometers 45 and 46 or other means to control the $y$ and $x$ deflecting amplifiers of a cathode ray display system 47 which may be a geographic plotter of known type. With this arrangement the light spot will travel over the face of the CRO of the display system 47 proportionally to the ship's true movement over the sea bottom. Alternatively or additionally the shafts 42 and 44 may be employed to operate the lead screws of a dead reckoning tracer 48 of a known type. The differentials 41 and 43 are preferably provided individually with hand cranks 51 and 52 connectable through clutches 53 and 54 for initially positioning the cathode ray spot or the dead reckoning "bug" to correspond to the ship's position.

Figure 3:
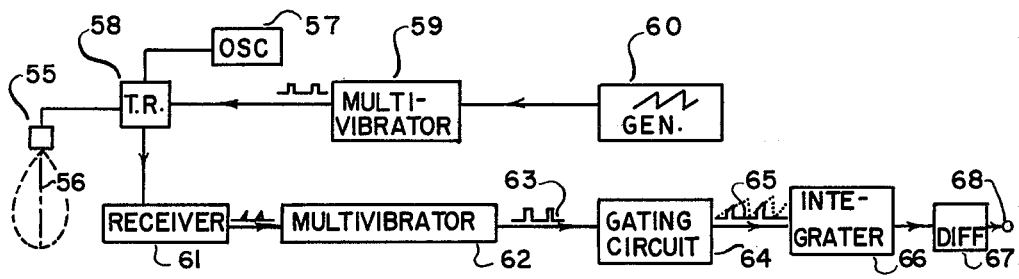
FIG. 3 is a block diagram of a sonar depth sounder for providing information in accordance with depth variation.

When utilizing the towing arrangement to be described in connection with FIG. 8 it is desirable to have constantly available information with respect to water depth. One suitable arrangement for providing a signal corresponding to depth variation is shown in FIG. 3 as comprising a transducer 55, having its transmitting and receiving axis 56 directed vertically downward, arranged to be driven by an oscillator 57 through a transmit receive switch 58 actuated by the pulses from a multi-vibrator 59 which is fired by the fly-back pulses of a saw tooth generator 60. Bottom reflected sound pulses received by the transducer 55 are passed through the receive switch 58 to a receiver 61 where they are amplified and fed to a multi-vibrator 62 which shapes the pulses to provide normalized gain signals 63 for controlling an electronic gate 64 the gating action of which is employed to cut from the saw tooth voltage from generator 60, pulses of constant width and of a height proportional to the time delay of an outgoing sound pulse and the receipt of its bottom echo. The shape and origin of these pulses passed by the gate 64 are indicated at 65. These pulses 65 are passed through an integrator 66 to provide a direct current voltage the magnitude of which is a measure of the water depth. Changes in the voltage output of the integrator 66 are detected by a differentiator 67 of very long time constant to provide at its output terminal 68 direct current signals whose amplitude, polarity and rates of change accurately represent the changes in water depth.

The pitch and roll movements of the vessel will produce fluctuations in the amount of Doppler in both the P and Q directions unless, of course, the entire sound head is stabilized. However, these effects are periodical and will average out if their effect is taken into consideration in choosing certain design parameters such as the time constant for the integrating circuits 16 and 32 in the system shown in FIG. 2.

Inasmuch as the set and drift of a ship is normally much smaller than the speed dead ahead and may often approach zero, the sensitivity of the system for processing the Doppler effect in the Q direction must be very great. Considerably less sensitivity can be tolerated if the two sound heads are arranged to be rotated in assembly so as to render the signal strength in the two systems approximately equal. Any such change of direction of the sound heads relative to the ship's axis must of course be accompanied by an equal angular shift of the gyro information introduced into the systems. Although, for the stated purpose, it is satisfactory to orient the sound heads by hand in accordance with the amount of set and drift prevailing from time to time, it is preferred to provide automatic means for orienting the sound heads so as to keep substantially equal the Doppler shifts they experience. Controls for such automatic means are available as voltage differences in the inputs to the motors 18 and 33 or as different turn rates of the shafts 19 and 34 (see FIG. 2).

Figure 4:
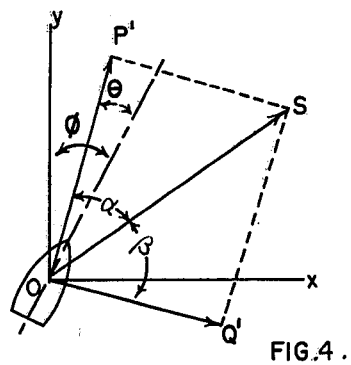
FIG. 4 is a diagram illustrating the geometry of the operation of a modified form of the invention.

Since in this automatic system the two vector components P' and Q' are always equal it will be evident that the bisector of the projections onto the horizontal plane of the two sound head axes will always point parallel to the direction of the true speed S. Now, if the sound head of a third speed sensing sound Doppler system is mounted for movement in assembly with the other two sound heads and with its axis in the vertical plane defined by the bisector it will always receive and process the Doppler due to the true speed S as indicated in FIG. 4. As shown, $\phi$ is the true course, $\alpha$ and $\beta$, each 45°, are the angles between the sound heads for P' and Q', and their bisector S, and $\theta$ is the correction angle to be applied to the gyro input to the third system (i.e., the system sensing the true speed S).

An automatic system designed to function in the manner just described is shown schematically in FIG. 5 where the two Doppler processing systems 70 and 71 for the P' and Q' components, respectively, provide outputs in the form of turn rates of shafts 72 and 73, which are compared in a differential 74 to provide through its output shaft 75 the heading control through ganging shaft 80 for the sound heads in the systems 70 and 71 as well as in a system 76 which senses the true speed S (because it is at all times directed in the direction of the bisecting vector S as above described). The output of this speed sensing system 76 appears in the form of the turn rate of a shaft 77 which is fed directly into a sine-cosine converter 78, here indicated as being of the ball solver type. The other input to the converter 78 is the shaft turn rate of the gyro control servo motor 79 as modified by the corective rotation of the shaft 75 introduced through a differential 81. The outputs of the converter 78 are the turn rates of two shafts 82 and 83 which represent, respectively, the $y$ and $x$ components of the true speed S. These shafts 82 and 83 are shown in FIG. 5 as controlling the lead screws of a dead reckoning tracer 84 but they may, of course, control any other suitable gear such as a geographic plotter as shown in FIG. 2.

It is evident that in the embodiment shown in FIG. 5 the P' and Q' units are being employed as null devices to maintain the sound head of the S Doppler unit alined with the S vector so that it at all times senses the speed along the course being made good. The equipment would be simplified if only one Doppler unit is employed in the null system. This single unit could be directed at right angles to the S system but its sensitivity and accuracy would be limited since it would always be operating in a condition of vanishing Doppler. If the single null Doppler system N has its sonar axis directed to form with the sonar axis of the S system a fixed angle of less than 90° it will no longer have to operate at vanishing Doppler and if this lesser angle is made 45° as indicated in FIG. 6 the design of the apparatus is facilitated.

It becomes apparent from an inspection of FIG. 6 that error signals, as represented by the differences in variations in the length of the null system vector N, and in the length of the speed vector S, develop quite efficiently for small deviations $\delta$ of the sonar axis of the S unit from the direction of the vector S of true bottom speed. An apparatus for utilizing this 45° arrangement is shown in FIG. 7 where like reference characters represent like parts in the embodiment illustrated in FIG. 5. In FIG. 7, a null Doppler unit 86 has its sound head axis directed at an angle of 45° from and arranged to be moved in assembly with the sound head axis of the S Doppler unit 76. The direct current output signal of the S unit 76 (corresponding to the output 17 in FIG. 2) is extracted on a lead 87 and fed into a bridge network 88. Similarly, the direct current output signal developed in the null unit 86 is extracted on a lead 89 and fed into the bridge network 88. The bridge 88, of known type, functions to provide a direct current output on a lead 90 corresponding in sign to the deviations $\delta$ (see FIG. 6) from the direction of true bottom speed and of zero magnitude only when the input from the lead 87 equals the square root of two ($\sqrt{2}$) times the input from the lead 89. The direct current error signals appearing on the output lead 90 of the bridge 88 are converted by a motor 91 into angular changes in the shaft 75 which controls the heading of the units 76 and 86 through the ganging shaft 80 and introduces a corresponding correction into the course input of the converter 78 via the differential 81.

It is possible to improve the operation of the equipment in deep water by mounting the several speed sensing Doppler units, or at least the sound heads of these units, in a streamlined body or fish which can be streamed and towed from a ship as indicated in FIG. 8. With the use of this arrangement a fish 92 may be streamed from a surface vessel 93 and towed by a line 94 incorporating the required lead lines between the sound head apparatus carried in the fish 92 and the remainder of the apparatus carried on board the vessel 93. The distance the fish 92 is towed above the ocean floor 95 can be kept approximately constant by well-known techniques through which a winch motor 96 would wind or unwind the towing cable 94 in accordance with the ocean depth. Any desired depth sensing apparatus may be employed for controlling such a winch motor, and for convenience of description the sonar depth sounder of FIG. 3 may be so employed by utilizing its D.C. output on the terminal 68 to control the winch motor 96.

The towing of the sound heads in a submerged fish, as just described, is especially advantageous where the depth of the water exceeds, say, 20 fathoms, at which depths difficulties due to excessive volume reverberation, increased refractions or reflections caused by density gradients, and the like, are frequently encountered. By placing the sound heads at a substantial distance below the surface many of these difficulties are avoided.

The invention thus far has been described in association with more or less complete apparatus suitable for achieving the maximum benefits from the invention, it being understood that most warships and many large vessels engaged in shallow water navigation are equipped with elaborate navigational aids such as dead reckoning tracers, geographic plotters, and the like. It is to be understood, however, that where elaborate information is not required such as on the smaller vessels which neither have nor can afford expensive navigational aids, less complete information will suffice. For example, by reference to FIG. 2 it will be apparent that the direct current voltage appearing on the lead 17 is impressed with velocity information in the azimuth direction the axis 14 of the receiver 13 is pointed. It is visualized that by using only this speed measuring component satisfactory results can be obtained. Thus, by the simple expedient of connecting a direct current voltmeter to the lead 17 in FIG. 2 its indication will carry speed information and can be calibrated in knots or any desired units. Further, by placing the sound heads on a dirigible base it will be possible for an operator to direct the sound heads in the direction giving the maximum reading which would automatically be the direction of the course made good.

While for the purpose of disclosing the invention certain specific embodiments thereof have been described in sufficient detail to enable those skilled in the art to practice the invention in accordance with what is now considered its preferred forms, it is to be understood that the invention may be incorporated in many different embodiments and that the several functions of specific components of a complete apparatus may be performed by other specific components, and that all such modifications which will occur to one skilled in the art after reading the present disclosure may be made without departing from the spirit of the invention, the scope of which is intended to be set forth in the appended claims.

The invention described herein may be manufactured and used by or for the Government of the United States of America for governmental purposes without the payment of any royalties thereon or therefor.

What is claimed as new and is desired to be secured by Letters Patent of the United States is:

1. A navigation system for determining a ship's speed along its track over the ground comprising ship carried means for transmitting wave energy towards the ground, two directionally sensitive transducer means for separately receiving wave energy reflected from two elemental areas of the ground spaced in azimuth by a known angle of less than 90° and having the same negative declination, means for deriving Doppler frequency signals from each of said receiver means, means responsive to said Doppler frequency signals to produce a control error signal having a characteristic representing the sense and magnitude of the departure of the ratio between said Doppler signals from a value equal to the secant of said known angle, and means utilizing said control error signal to rotate said receiving means in azimuth until said control error signal is nulled, whereby one of said receiving means is directed along the ship's track.

2. A system in accordance with claim 1 wherein said known angle is 45°.

References Cited in the file of this patent

UNITED STATES PATENTS

| | | |
|---|---|---|
| 1,471,547 | Chilowsky et al. | Oct. 23, 1923 |
| 1,864,638 | Chilowsky | June 28, 1932 |
| 2,193,361 | Rice | Mar. 12, 1940 |
| 2,223,224 | Newhouse | Nov. 26, 1940 |
| 2,333,688 | Shepard | Nov. 9, 1943 |
| 2,403,625 | Wolff | July 9, 1946 |
| 2,413,620 | Guanella | Dec. 3, 1946 |
| 2,426,228 | Mackta | Aug. 26, 1947 |
| 2,455,639 | Anderson | Dec. 7, 1948 |
| 2,476,032 | Feldman et al. | July 12, 1949 |
| 2,496,674 | Omberg | Feb. 7, 1950 |
| 2,859,436 | Tull | Nov. 4, 1958 |
| 2,869,118 | Tull et al. | Jan. 13, 1959 |